N. C. NICHOLSON.
FISH CLEANING MACHINE.
APPLICATION FILED MAR. 17, 1919.

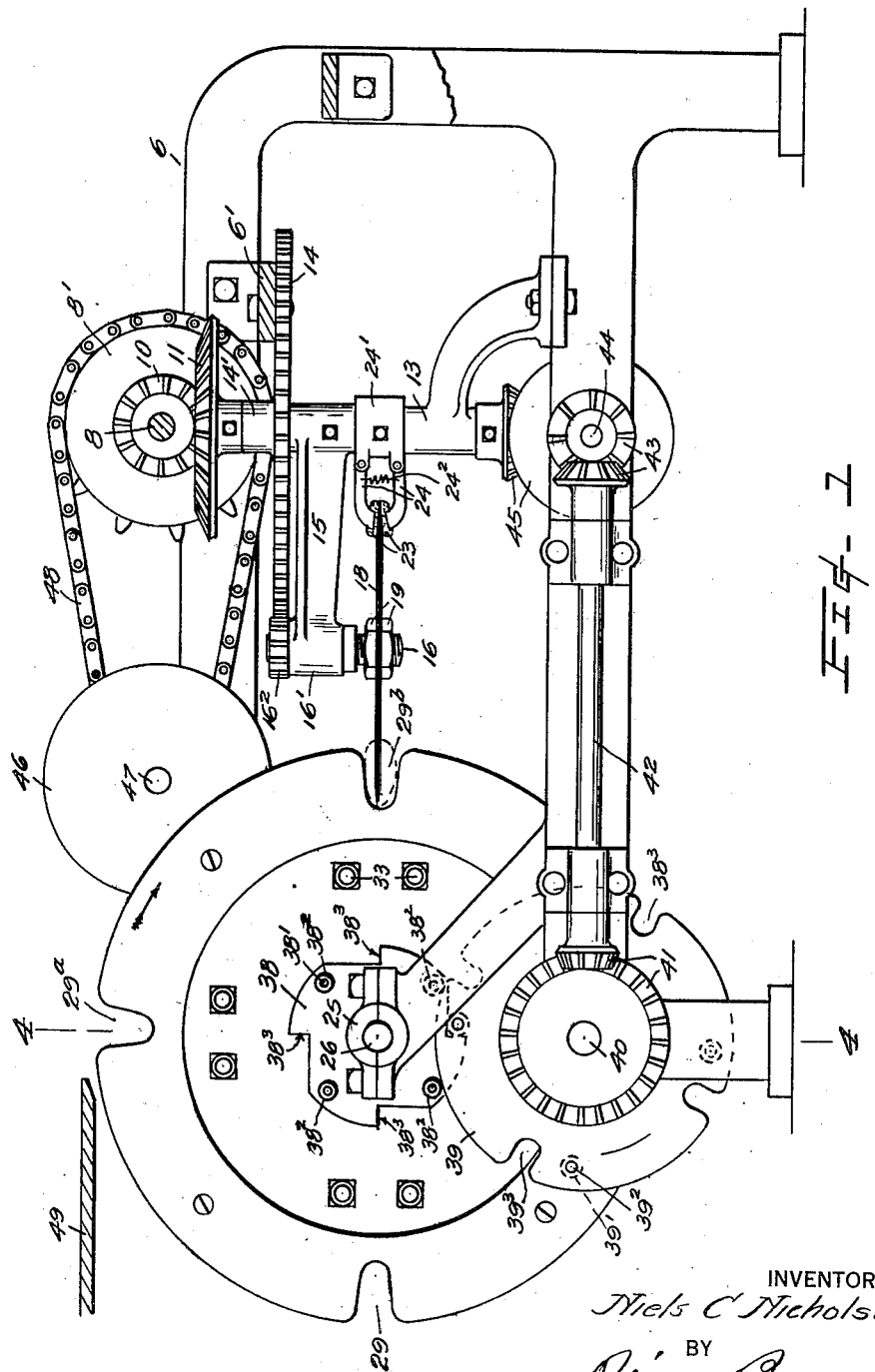

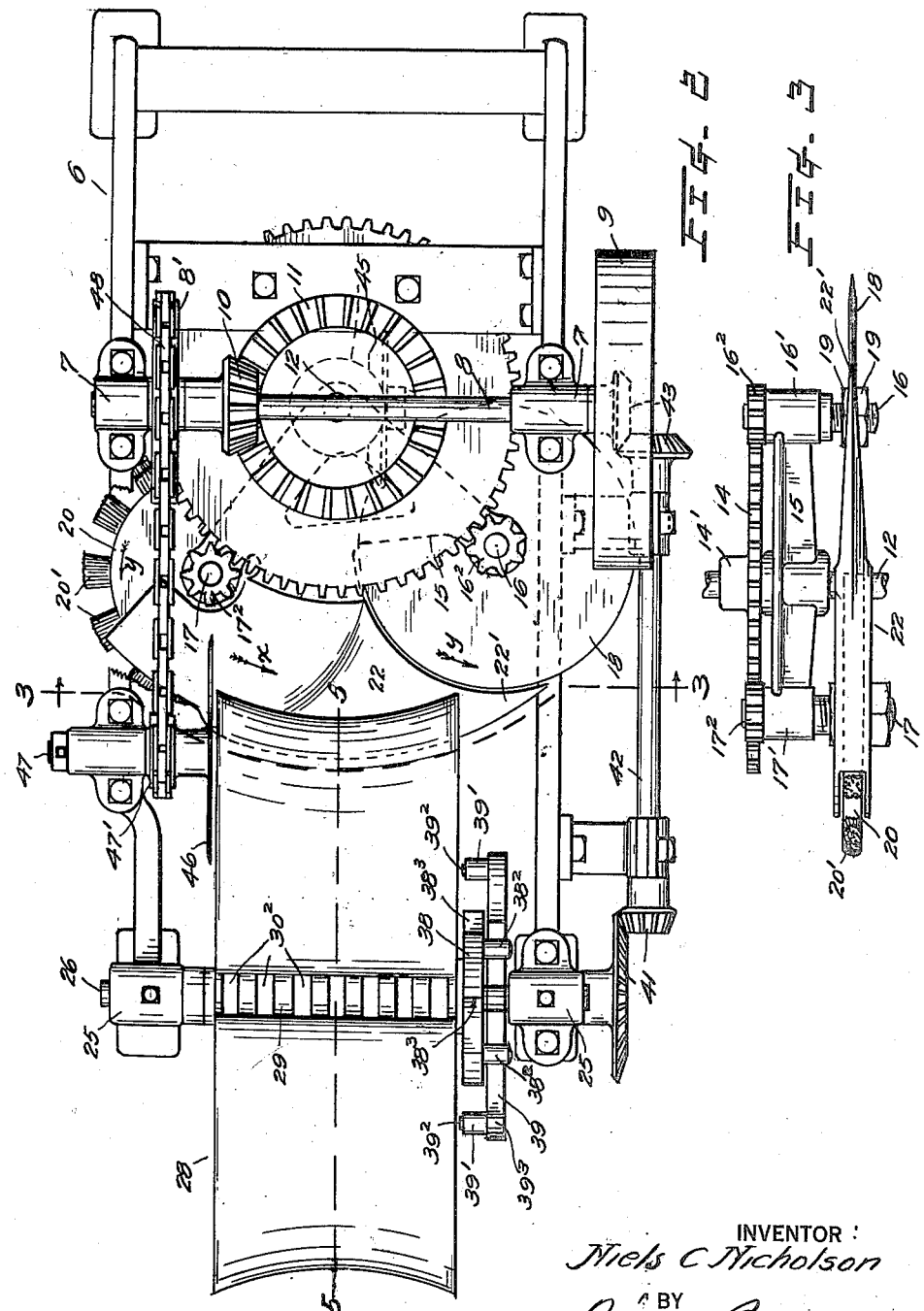

1,316,850.

Patented Sept. 23, 1919.
3 SHEETS—SHEET 3.

INVENTOR
Niels C. Nicholson
BY
Pierre Barnes
ATTORNEY

UNITED STATES PATENT OFFICE.

NIELS C. NICHOLSON, OF SEATTLE, WASHINGTON.

FISH-CLEANING MACHINE.

1,316,850.  Specification of Letters Patent.  Patented Sept. 23, 1919.

Application filed March 17, 1919. Serial No. 283,133.

*To all whom it may concern:*

Be it known that I, NIELS C. NICHOLSON, a citizen of the United States, residing at Seattle, in the county of King and State of Washington, have invented certain new and useful Improvements in Fish-Cleaning Machines, of which the following is a specification.

This invention relates to fish cleaning machines; and its object is to provide a machine for efficiently and rapidly splitting and gutting small fish, such as herring, although it may be used with other varieties.

A further object of the invention is to provide a machine of this character which is automatic in its action and provided with improved mechanism for holding, feeding and discharging the fish.

With these ends in view, the invention consists in the novel construction and combination of devices, as will be hereinafter described and claimed.

Figure 4:
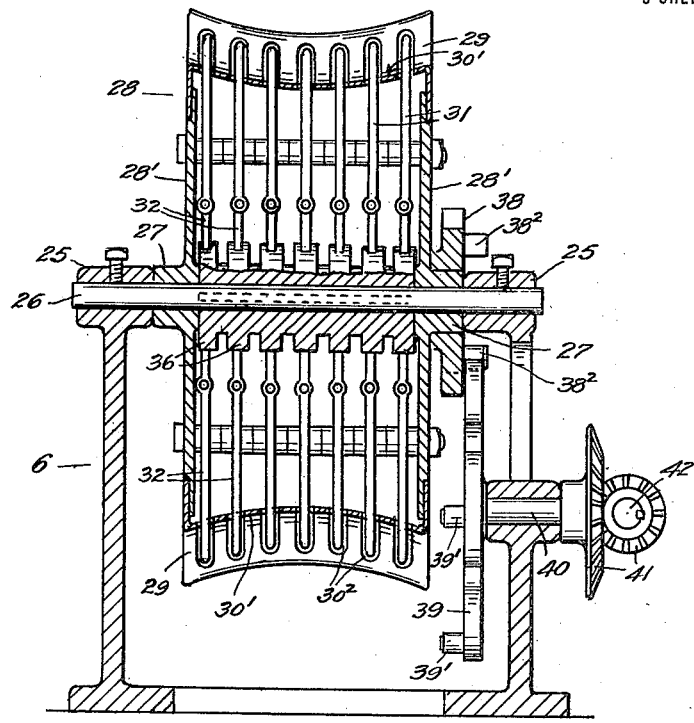
Figure 5:
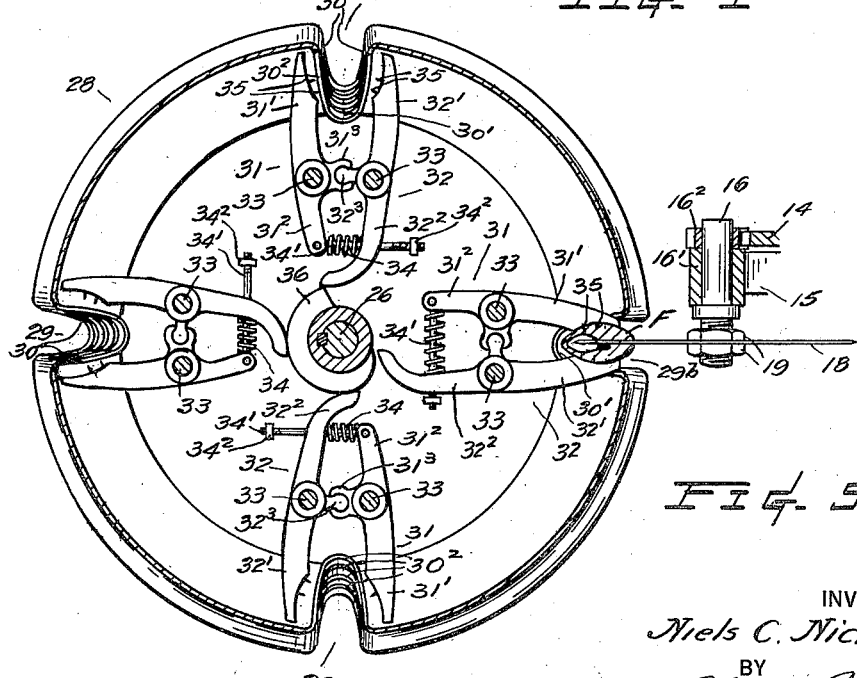

In the accompanying drawings, Figure 1 is a view partly in side elevation and partly in vertical section of a machine embodying my invention. Fig. 2 is a plan view of the same. Fig. 3 is a front elevational view of the revoluble carrier taken substantially from broken line 3—3 of Fig. 2. Fig. 4 is a transverse vertical section through 4—4 of Fig. 1. Fig. 5 is a longitudinal section through 5—5 of Fig. 2 and illustrating the rotary splitting knife in operating position.

The framework of the machine, indicated generally by 6, is provided adjacent to its rear end with bearing boxes 7 for a transverse shaft 8 having a pulley 9 on one end for a power-driven belt, not shown. Mounted on said shaft is a bevel toothed pinion 10 in mesh with a bevel gear 11 mounted on the upper end of an upright shaft 12 which is journaled in a bearing box 13 and also in the hub $14^1$ of a master spur gear 14 which is rigidly secured to a frame member $6^1$.

Mounted to rotate with the shaft 12 and subjacent to the master gear 14 is a carrier 15 provided with journal boxes $16^1$, $17^1$ (Fig. 3) for vertically disposed arbors 16 and 17 which are respectively rotated by means of gears $16^2$ and $17^2$ engaging the non-rotatory master gear 14 as they revolve with the carrier, 18 represents a disk-shaped fish-cutting knife or splitter, as hereinafter designated, which is adjustably secured upon the screw-threaded lower portion or arbor 16 by means of nuts 19.

A brush wheel 20 having bristles $20^1$ about its periphery is in like manner secured by nuts 21 to the arbor 17. Secured to carrier 15 and located between the splitter 18 and brush 20 is a wedge-shaped device 22 hereinafter designated as the spreader, having a sharp forward edge $22^1$ and at its rear is made hollow to accommodate the brush.

23 (Fig. 1) represents a pair of abrasive bodies disposed to engage the splitter about its circumference for maintaining the same sharp, said bodies as shown being connected by arms 24 to a collar $24^1$ on the shaft 12 and are yieldingly held in juxtaposition with the splitter by a spring $24^2$.

Adjacent to its front end, said frame is provided with boxes 25 in which is seated a transversely arranged non-rotatable shaft 26 which extends through the hubs 27 provided in the heads $28^1$ of a fish carrier or drum 28. Said drum is provided in its periphery with a plurality of radially disposed recesses 29 of substantially U shapes afforded by reëntrant walls 30.

The inner surfaces $30^1$ of said recesses are each of a concave arcuate form concentric to the axis of the shaft 12 when the recesses are successively brought into the plane of the orbital travel of the aforesaid splitter 18 and at the rear of the drum.

Provided in the drum for the respective recesses are series of fish-grasping devices (Figs. 4 and 5) comprising pairs of complementary levers 31 and 32 disposed substantially radially of the drum and fulcrumed upon rods 33 supported by the drum heads $27^1$. The outer arms or jaws $31^1$ and $32^1$ of said levers are yieldingly caused, by means of springs 34 interposed between the other arms $31^2$ and $32^2$, to enter the respective recesses 29 through slots $30^2$ provided therefor in the walls 30 for the purpose of engaging fish subsequent to being deposited within the recesses, said fish being penetrated by sharp prongs 35 protruding from the opposing faces of the complementary jaws. For relatively opening and causing said jaws to be, upon occasion, retracted from the recesses, I provide on the shaft 26 a number of cams 36 to engage the lever arms $32^2$ during the intermittent revoluble movements thereof with the drum. $34^1$ represent screw-threaded rods secured to the respective arms $31^2$ and extending through apertures provided in the associated arms $32^2$ to receive nuts $34^2$ which are adjusted to prevent the jaws of the respective levers coming together even though no fish is carried thereby for the purpose of allowing the splitter 18 to pass between the respective jaws.

To insure equal closing and opening movements to the jaws of each pair of gripping devices, the associated levers are provided with arm elements $31^3$ and $32^3$, making ball and socket connections with each other. Intermittent rotary motion is imparted to the drum 28 and the latter is locked in predetermined positions by means of the following mechanism.

38 represents a gear rigidly secured to an end of said drum and is provided with spaced laterally protruding pins $38^1$ upon which are journaled rollers $38^2$, one for each of the drum recesses 29. The gear 38 is also provided with notches to afford circumferentially spaced shoulder $38^3$ arranged to be successively engaged by rollers $39^1$ provided on pins $39^2$ protruding from a driving wheel 39. This wheel is of a diameter to have its circumference contact with two of the rollers $38^2$ of gear 38 until the latter is given a partial rotary movement by one of the rollers $39^1$ acting against a gear shoulder to cause a gear roller to enter one of the slots $39^3$ provided in the wheel, whereupon the wheel, acting through the medium of a gear roller within a slot, rotatably advances the gear, together with the drum, until the referred to gear roller has withdrawn from the slot and coacts with a second roller against the periphery of wheel 39 to temporarily lock the drum during an idle movement of the driving wheel.

The wheel 39 is mounted on a transverse shaft 40 subjacent to the shaft 26 and is rotated by means of bevel gears 41 from longitudinal shaft 42 which, in turn, is driven by means of bevel gears 43 from a transverse shaft 44 receiving its motion through the medium of bevel gears 45 from the upright shaft 12.

46 represents a circular cutter knife disposed in proximity to and at one side of the drum 28 for the purpose of removing the heads from fish as they are progressively carried from the fish feeding to the gutting positions of the drum's rotatory movements.

As shown in Figs. 1 and 2, the arbor 47 of said cutter wheel is driven by means of a chain 48 passing about sprocket wheels $47^1$ and $8^1$ on the arbor 47 and shaft 8, respectively. 49 represents a table upon which the fish are conveniently laid preparatory to being fed or deposited into the recesses 29 when the latter are in their uppermost positions.

The operation of the invention is as follows:

The shaft 8 being set in motion acts through the medium of gears 10 and 11 to rotate the upright shaft 12 thereby actuating carrier 15 to revolubly carry the splitter knife 18, the cleaning brush 20 and the spreader 22, in the direction denoted by arrow $x$ in Fig. 2.

In their revoluble travel, the splitter and brush are caused to rotate in the directions of arrows $y$ by reason of the respective gears $16^2$ and $17^2$ engaging the teeth of the non-rotatable master gear 14. Said upright shaft also serves to impart rotary motion through the medium of shafts 44 and 42 and gears 45, 43 and 41 to the shaft 40, upon which is mounted the slotted wheel 39.

In the illustrated embodiment, the wheel 39 is rotated once to every four rotations of the carrier 15. The slotted wheel 39 is rotated continuously during the operation of the machine and acts to transmit intermittent rotary motion to the drum. This is accomplished through the agency of its rollers $39^1$ which successively engage the shoulders $38^3$ of pin gear 38 to rotatably advance the latter to cause one of the rollers thereof to enter a slot $39^3$ of wheel 39, whereby the pin gear is afforded a fourth of a rotation together with the drum 28 to which the pin gear is rigidly secured.

The above explained driving devices, it is to be noted, are arranged to have a roller of the pin gear after being withdrawn from a slot of wheel 39, coöperate with a second pin gear roller, by both resting against the periphery of wheel 39 intermediate its slots, to interrupt the rotary movement of the drum and temporarily retain the same at rest with one of its recesses, as $29^a$, Figs. 1 and 5, at the top, and another, as $29^b$, in position to enable the splitter, spreader and brush to pass therethrough.

With the drum thus idle, the operator takes a fish from table 49 and places it belly downward in the uppermost recess $29^a$ and with its head protruding beyond the end of the drum to be decapitated by knife 46 when the drum is given rotary motion. The drum, upon being given a fourth of a rotation, transfers the fish from the top to the side of the drum and into the orbital travel of the splitter. In such rotatory travel, the lever arms $32^2$ of the fish-gripping devices are disengaged from the respective cams 36, whereupon the springs 34 act to cause the jaws $31^1$ and $32^1$ to close upon the fish. The fish is retained by such gripping devices within the drum recess while the splitting and gutting operations are being performed and until the lever arms 32² are influenced by the cams to separate the jaws to enable the fish to drop from a recess as it descends below the position in which the fish is treated and in the subsequent rotary movement of the drum.

With the drum temporarily stationary in the position in which it is represented in Fig. 5, a fish, as F, held by the respective gripping jaws within the recess 29ᵈ is first cut by the splitter knife 18 at one side of the backbone through its back into the visceral cavity followed by the spreader 22 which enters the cut thus made and distends the fish to afford an opening through which the cleaning brush 20 passes in its rotary movement while revolving with the carrier 15.

The splitter or knife 18 and said brush thus serve to respectively slit a fish and remove the intestines therefrom.

If in the operation of the machine a recess is brought into its 29ᵇ position unprovided with a fish, the splitter 18 and the forward portion 22¹ of the spreader pass between the respective jaws 31¹—32¹ without encountering the prongs 35 by reason of the rods 34¹ and nuts 34² retaining the jaws in spaced relations. The spreader 22, moreover, is arranged in the absence of a fish to engage the faces of the jaws at or near the outer extremities thereof which is unprovided with teeth or prongs so that the latter cannot become broken or mutilated by the spreader.

Various changes and modifications may be made to the aforedescribed embodiment of my invention and within the scope of the appended claims as, for example, by the omission of the spreader and brush, the machine can advantageously be used for fish-slitting or cutting purposes only.

What I claim is—

1. In a machine of the class described, fish-carrying means, mechanism for imparting intermittent revoluble movements to said means, and devices revoluble about an axis rectangular to the axis of revolution of said means whereby the fish carried by the latter are successively treated to remove the viscera therefrom.

2. In a machine of the class described, fish-carrying means provided with fish-receiving recesses revoluble about a horizontal axis, means to successively engage and release fish to and from said carrying means within the respective recesses, and rotary fish slitting means revoluble in a plane disposed approximately radially of said fish-carrying means.

3. In a machine of the class described, a fish carrier, means to impart intermittent movements thereto, means movable transversely to the direction of travel of said carrier and rendered operable while the latter is at rest to successively slit the fish and remove the viscera therefrom.

4. In a machine of the class described, a rotatable splitter and a brush revolving about a vertical axis, a drum rotatable about a horizontal axis and serving as a fish carrier, means to afford uninterrupted revoluble movements to said splitter and brush and to impart intermittent rotary movements to said drum to convey fish from the feeding position into position to be treated by said splitter and brush, and devices carried by the drum to successively engage and release the fish prior to and subsequent to their being brought into and removed from the referred-to treating position.

5. In a machine of the class described, a rotatable splitter and a brush revolving about a vertical axis, a drum rotatable about a horizontal axis and serving as a fish carrier, means to afford intermittent rotary movements to said drum to convey fish from the feeding position into position to be treated by said splitter and brush, and devices carried by the drum to successively engage and release the fish prior to and subsequent to their being brought into and removed from the referred-to treating position.

6. In a machine of the class described, a drum rotatable about a horizontal axis and provided with peripherally disposed fish-receiving recesses, a rotary splitter revoluble about a vertical axis, means to rotate said drum, and means rendered operable by the aforesaid means whereby the rotary movements of the drum are interrupted when each of the recesses are successively brought within the path of travel of said splitter.

7. In a machine of the class described, a drum rotatable about a horizontal axis and provided with peripherally disposed fish-receiving recesses, a rotary splitter, a rotary brush, said splitter and brush revolving about a vertical axis, means to rotate said drum, and means rendered operable by the aforesaid means whereby the rotary movements of the drum are interrupted when each of the recesses are successively brought within the path of travel of said splitter and brush.

8. In a machine of the class described, a drum rotatable about a horizontal axis and provided with peripherally disposed fish-receiving recesses, a rotary splitter revoluble about a vertical axis and in a plane with the axis of said drum, means to rotate said drum, and means rendered operable by the aforesaid means whereby the rotary movements of the drum are interrupted when each of the recesses are successively brought within the path of travel of said splitter.

9. In a machine of the class described, devices for treating fish to remove the viscera therefrom, consisting of a rotary carrier, a splitter and a brush revolubly mounted on the carrier, means actuated by the revoluble movements of said splitter and said brush to effect the rotations thereof, and means interposed between the splitter and brush whereby fish slitted by said splitter will have its bifurcations spread apart for the passage of said brush through the intestinal cavity of the fish.

10. In a machine of the class described, a fish carrier, means to impart intermittent movements thereto, fish splitting and cleaning devices operable to treat the fish between the successive intermittent movements of the carrier, means rendered operable during the movements of the carrier for removing the fish heads, and means to engage and release the fish to and from said carrier during the successive periods of the carrier's travel.

11. In a machine of the class described, intermittently driven fish-carrying means, devices having fish-engaging jaws to releasably secure fish to said means, a rotary fish-slitting knife and a rotary brush, and mechanism connecting the knife and the brush with said fish-carrying means whereby fish carried by the latter will be successively brought into positions to be treated by said knife and said brush between the successive intermittent movements of said means, and means serving to cause the releasing devices to become operative and inoperative during the movements of the aforesaid means.

12. In a machine of the class described, a rotary drum provided with fish-receiving recesses, means to drive said drum intermittently, devices for releasably securing fish within the respective recesses, said devices being actuated by the rotary movements of the drum, means for treating fish to remove the intestines therefrom when the drum is temporarily at rest, and means rendered operative by the rotary movements of the drum for removing the heads from fish.

Signed at Seattle, Washington, this 7th day of March, 1919.

NIELS C. NICHOLSON.

Witnesses:
  PIERRE BARNES,
  E. PETERSON.